P. M. MALONEY.
LUBRICATOR FOR SHOCK ABSORBERS.
APPLICATION FILED MAR. 27, 1915.

1,168,407.

Patented Jan. 18, 1916.
2 SHEETS—SHEET 1.

Inventor
Philip M. Maloney

Witnesses

By

Attorney

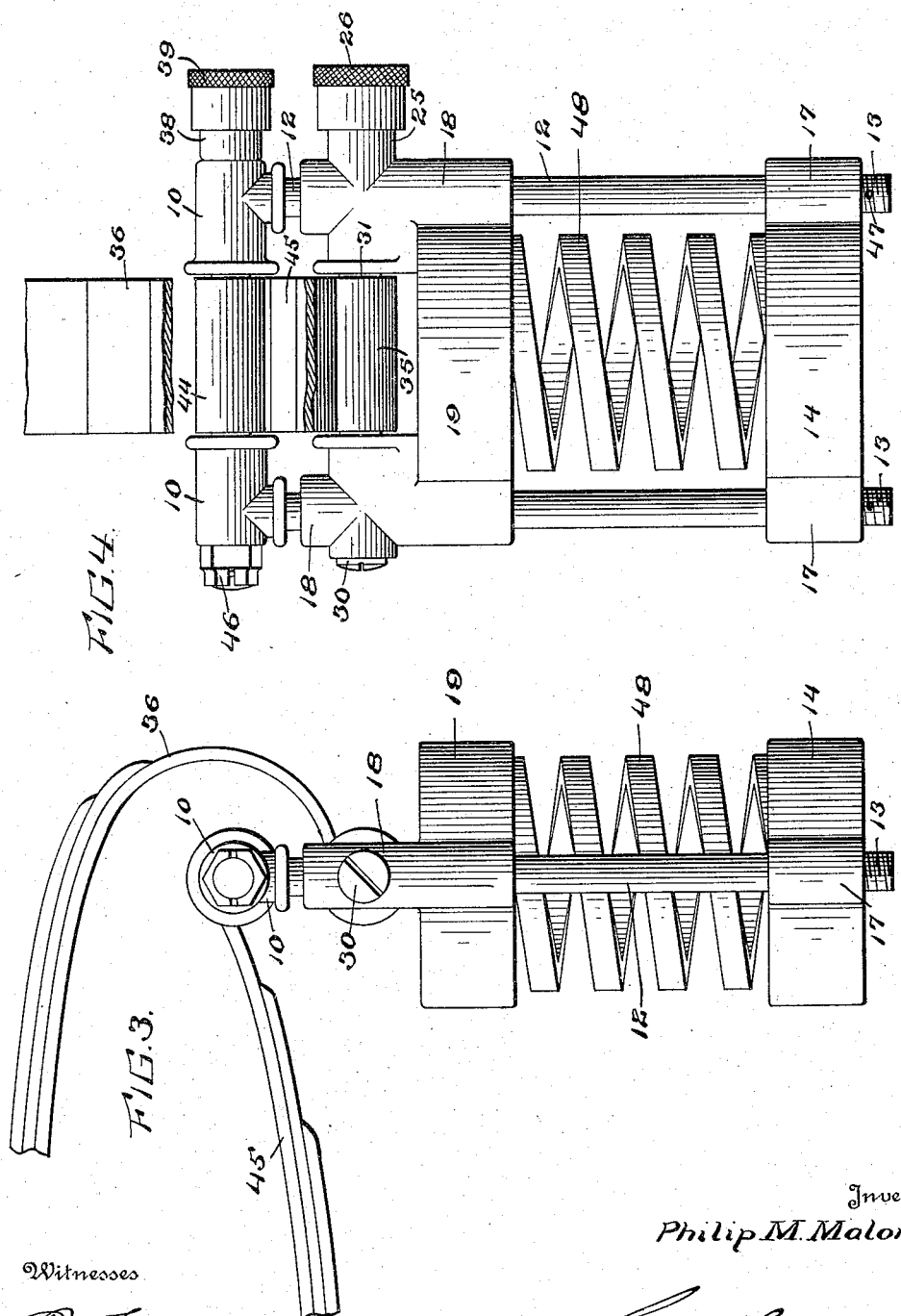

UNITED STATES PATENT OFFICE.

PHILIP M. MALONEY, OF PHILADELPHIA, PENNSYLVANIA; ROBERT E. LONG ADMINISTRATOR OF SAID MALONEY, DECEASED.

LUBRICATOR FOR SHOCK-ABSORBERS.

1,168,407.   Specification of Letters Patent.   Patented Jan. 18, 1916.

Application filed March 27, 1915. Serial No. 17,463.

*To all whom it may concern:*

Be it known that I, PHILIP M. MALONEY, a citizen of the United States, residing at Philadelphia, in the county of Philadelphia and State of Pennsylvania, have invented certain new and useful Improvements in Lubricators for Shock-Absorbers, of which the following is a specification.

This invention relates to shock absorbers and has special reference to a lubricator for such shock absorbers.

The principal object of the invention is to provide an improved and simplified general construction of such shock absorbers of a type adapted for general use on automobiles and especially for connecting the ends of the upper and lower semi-elliptical springs.

A second object of the invention is to provide an improved construction of this kind wherein an improved distribution of lubricant is obtained.

A third object of the invention is to provide an improved arrangement and construction in devices of this kind having certain lubricator parts arranged to act as bearing pins, the whole being adapted to be readily assembled in connection with a shock absorber.

With the above and other objects in view, as will be hereinafter apparent, the invention consists in general of certain novel details of construction and combinations of parts hereinafter fully described, illustrated in the accompanying drawings and specifically claimed.

Figure 1:
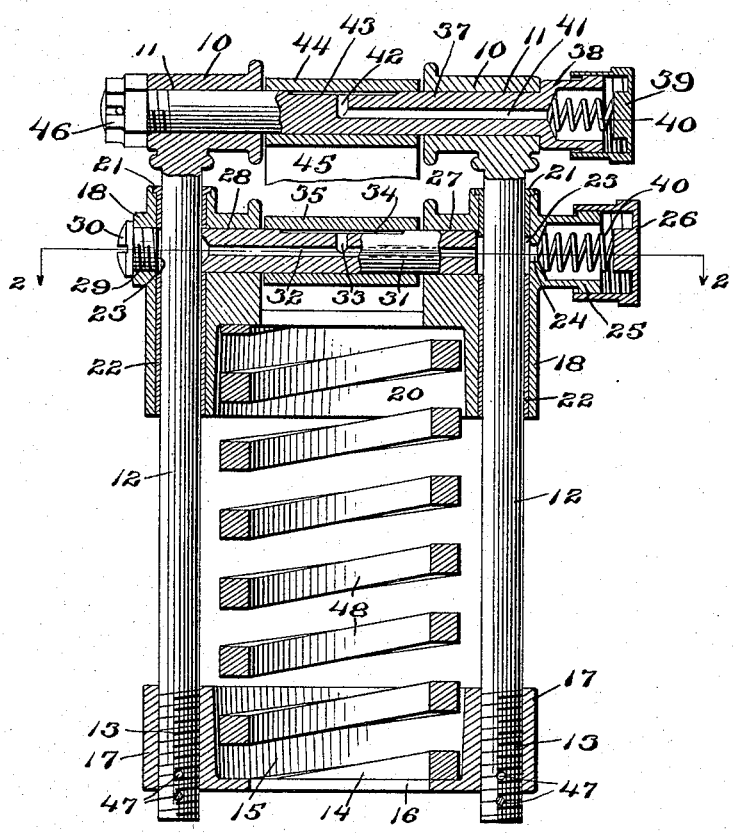
Figure 2:
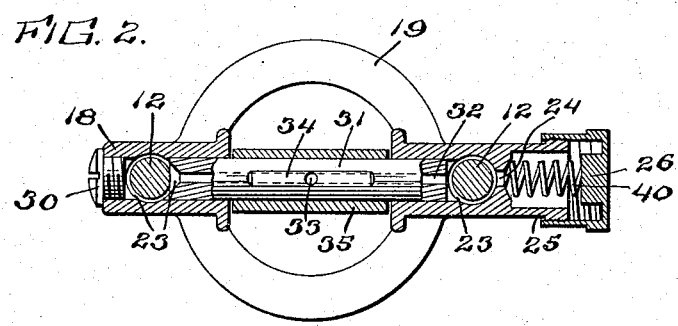

In the accompanying drawings, like characters of reference indicate like parts in the several views, and Figure 1 is a vertical transverse median section through a shock absorber provided with a lubricator arrangement forming this invention; Fig. 2 is a section on the line 2—2 of Fig. 1; Fig. 3 is a side view of such a shock absorber and lubricator; Fig. 4 is an end view partly broken away.

In carrying out the objects of this invention there is provided a pair of members 10 which are preferably drop-forgings and which each have a bore 11 and a bolt stem 12 threaded at its outer end as indicated at 13. Each bolt stem extends from the body adjacent one end thereof, as clearly shown in Fig. 1.

At 14 is a bottom member, preferably drop forged and provided centrally with a cup-shaped spring seat 15 having its bottom open as at 16. Extending from this spring seat are diametrically-disposed lugs 17 having threaded apertures for the reception of the threaded ends 13 of the members 10. By means of this construction the bottom member 14 constitutes a yoke to carry the members 10. However, prior to assembling the bottom member 14 and the members 10, the bolt stems 12 are passed through suitable ears 18 formed on an upper spring seat member 19, such member having in its bottom a spring receiving cup 20, the bottom of the cup being upward and having a centrally disposed opening, as clearly shown in Fig. 1. The ears 18 are each provided with an upper bushing 21 and a lower bushing 22 spaced from the upper bushing to provide a chamber 23 surrounding the respective stem 12 for the passage or reception of oil or other suitable lubricant. Leading to one of these chambers is a passage 24 which communicates with the interior of the body 25 of a grease cup, this body being preferably formed integral with the lug 18 and having screwed thereon a cap 26 so that a compression grease cup is formed. Alined opposite the opening 24 is a pin-receiving opening or bearing 27 which also communicates with the chamber 23 on that side.

On the opposed side of the member 19 is provided a lateral passage alined with the openings 24 and 27 and the inner end 28 of which forms a pin-receiving opening while the outer end 29 is threaded to receive a threaded plug 30, this outer end being slightly larger than the inner end so that a pin 31 may be passed therethrough into the bearings, this being, of course, done before the member 19 is placed on the stems 12. This pin has an axial opening 32 extending therethrough so that communication is afforded between the two chambers 23 thus permitting grease to pass from the cup through the right-hand chamber 23 and into the left-hand chamber 23 whereby lubrication of both stems 12 is effected. Leading from the opening 32 is a lateral opening 33 which communicates with a groove 34 on the surface of the pin so that grease may be forced therein for the purpose of lubricating the eye 35 of the spring member 36.

Through the openings 11 is a spring-bearing pin 37 having an enlarged hollow head 38 at one end arranged to form a grease cup and provided with a cap 39 similar to the cap 26, both of these caps being held from accidental rotation by suitable friction springs 40. Extending from the interior of the grease cup or head 38 is an axial opening 41 terminating at its inner end in a radial passage or opening 42 leading to an oil groove 43 on the pin 37 whereby the eye 44 of the spring 45 may be lubricated. The opposite end of the pin 37 is provided with a suitable locked nut 46 to prevent accidental dis-engagement of the parts. Cotter-pin holes 47 are preferably provided at the lower ends of the stems 12 to prevent accidental break-downs through stripping of the threads in the part 14 or on the parts 12 under the stress exerted by the shock-absorber spring 48, the latter being mounted in the cup-shaped spring seats, as shown.

There has thus been provided a simple and efficient device of the kind described and for the purpose specified.

Having thus described my invention, what I claim as new, is:—

1. A shock absorber comprising guide rods, a yoke provided with ears slidable on the rods and having spaced transversely alined passages and lubricant receiving chambers surrounding the rods intermediate the ends of the passages, the inner ends of the latter forming pin-receiving openings, the outer end of one passage constituting a grease holder including a closure, and the like end of the other passage being threaded to receive a retaining plug, and a pin having its ends held in the openings and provided with an all-through axial opening to provide communication between the chambers.

2. The combination with a shock-absorber having spaced guide rods and a yoke provided with ears slidable on said guide rods and having spaced alined transverse passages, the ears having lubricant-receiving chambers surrounding the rods intermediate the ends of the passages, the inner ends of the passages forming pin-receiving openings, the outer end of one passage being enlarged to form a grease-cup and having a cover, the outer end of the other passage being enlarged and threaded to receive a threaded retaining plug, and a pin having its ends held in the pin-receiving openings and provided with an axial opening extending from end to end to afford communication between said chambers, the pin also having a lateral passage between its openings and surface to permit passage of the lubricant to the surface.

In testimony whereof I affix my signature in presence of two witnesses.

PHILIP M. MALONEY.

Witnesses:
KATHRYN C. TITLOW,
CHAS. V. HECKMAN.

Copies of this patent may be obtained for five cents each, by addressing the "Commissioner of Patents, Washington, D. C."